US012804678B2

(12) United States Patent
Gadhai et al.

(10) Patent No.: US 12,804,678 B2
(45) Date of Patent: Nov. 17, 2026

(54) NETWORK-CONTROLLED REPEATER FOR COMMUNICATING SIGNALS TO BASE STATION AND USER EQUIPMENTS IN WIRELESS COMMUNICATION NETWORK

(71) Applicants: INDIAN INSTITUTE OF TECHNOLOGY KANPUR, Kanpur (IN); CENTRE OF EXCELLENCE IN WIRELESS TECHNOLOGY, Chennai (IN)

(72) Inventors: Shyam Vijay Gadhai, Kanpur (IN); Jyotirmay Saini, Kanpur (IN); Rohit Budhiraja, Kanpur (IN); Deepak Padmanabhan Maya, Chennai (IN); Priyanka Dey, Chennai (IN)

(73) Assignees: INDIAN INSTITUTE OF TECHNOLOGY KANPUR, Kanpur (IN); CENTRE OF EXCELLENCE IN WIRELESS TECHNOLOGY CHENNAI (IN)

( * ) Notice: Subject to any disclaimer, the term of this patent is extended or adjusted under 35 U.S.C. 154(b) by 354 days.

(21) Appl. No.: 18/308,696

(22) Filed: Apr. 28, 2023

(65) Prior Publication Data

US 2023/0354378 A1 Nov. 2, 2023

(30) Foreign Application Priority Data

Apr. 28, 2022 (IN) ............................. 202211025000

(51) Int. Cl.
*H04W 72/25* (2023.01)
*H04W 76/10* (2018.01)
*H04W 88/04* (2009.01)

(52) U.S. Cl.
CPC ........... *H04W 72/25* (2023.01); *H04W 76/10* (2018.02); *H04W 88/04* (2013.01)

(58) Field of Classification Search
CPC ..... H04W 72/25; H04W 76/10; H04W 88/04; H04W 72/20; H04W 84/047
See application file for complete search history.

(56) References Cited

U.S. PATENT DOCUMENTS

| | | | | |
|---|---|---|---|---|
| 2021/0194569 | A1* | 6/2021 | Ray Chaudhuri . | H04B 7/15507 |
| 2022/0053433 | A1* | 2/2022 | Abedini ................ | H04L 5/0023 |
| 2022/0132464 | A1* | 4/2022 | Agiwal ............... | H04W 72/044 |
| 2023/0084692 | A1* | 3/2023 | Luo ...................... | H04B 7/2612 |
| 2023/0097862 | A1* | 3/2023 | Horn ..................... | G01S 13/765 455/456.1 |

(Continued)

*Primary Examiner* — Steven Hieu D Nguyen
(74) *Attorney, Agent, or Firm* — Jason C. Cameron

(57) ABSTRACT

A network-controlled repeater for communicating signals to at least one BS and at least one UE, is disclosed. The NCR includes a mobile terminal configured to: perform signaling exchange with at least one BS for an initial access and synchronization, and to receive at least one side control information (SCI) from the at least one BS. The SCI is at least a dynamic configuration. The SCI is received in at least one of: a dedicated control channel for the NCR scrambled using a dedicated RNTI for the SCI of the NCR. The NCR further includes a radio unit configured to: receive at least one signal of a first set of signals based on the SCI, and to transmit the at least one signal of the first set of signals based on at least one SCI.

30 Claims, 3 Drawing Sheets

(56) References Cited

U.S. PATENT DOCUMENTS

| | | | | |
|---|---|---|---|---|
| 2023/0119750 | A1* | 4/2023 | Abedini | H04B 17/346 455/11.1 |
| 2023/0130003 | A1* | 4/2023 | Ali | H04W 56/001 370/329 |
| 2023/0345390 | A1* | 10/2023 | Yin | H04B 7/15528 |
| 2024/0022315 | A1* | 1/2024 | Kusashima | H04W 16/26 |
| 2024/0022931 | A1* | 1/2024 | MolavianJazi | H04B 7/155 |
| 2025/0088948 | A1* | 3/2025 | Karimidehkordi | H04B 7/15528 |
| 2025/0097987 | A1* | 3/2025 | Dai | H04W 24/02 |
| 2025/0106665 | A1* | 3/2025 | Harada | H04W 16/26 |
| 2025/0158698 | A1* | 5/2025 | Ali | H04B 7/15528 |

* cited by examiner

NETWORK-CONTROLLED REPEATER FOR COMMUNICATING SIGNALS TO BASE STATION AND USER EQUIPMENTS IN WIRELESS COMMUNICATION NETWORK

CROSS-REFERENCE TO RELATED APPLICATIONS

This application claims priority from a patent application filed in India having Patent Application No. 202211025000 filed on Apr. 28, 2022 and titled "SYSTEM AND METHOD FOR PROCEDURES AND SIGNALING EXCHANGES FOR NETWORK-CONTROLLED REPEATERS".

FIELD OF INVENTION

Embodiments of the present disclosure relate to repeaters in a network, and more particularly to a network-controlled repeater for communicating a plurality of signals to at least one of: at least one base station (BS) and at least one user equipment (UE) in a wireless communication network.

BACKGROUND

In recent times, an increasing need, for high data rates and reliable communications in telecommunication industry, has given rise to new technologies which are continuously evolving such as fourth generation (4G) Long Term Evolution (LTE) and fifth generation (5G) New Radio (NR). Further, the use of higher frequencies in giga hertz (GHz) and beyond range in the above said technologies limit a coverage of a single network node. Hence, a commercial deployment of the above said technologies requires a large number of network nodes (e.g., base stations) for accesses to user devices in a wider area. Further, the use of the large number of the base stations, for accessing the user devices, increases capital and operating expenditures.

Hence, repeaters are used in a wireless communication network to relay signals between the base stations and the user devices. In the wireless communication network, the base station (BS) communicates with the user devices (e.g., UE) that are within a base station's network coverage. To extend the network coverage of the BS, the repeaters are used to communicate with the user devices that are receiving a poor signal quality from the BS. A typical repeater receives a signal from a transmitting device and amplifies the signal and forwards the signal towards a receiving device. The repeater can amplify and forward the signal both in a Downlink (DL) (i.e., from the BS to the user device), and in an Uplink (UL) (i.e., from the user device to the BS).

The repeaters are generally used in the Long Term Evolution (LTE) and the New Radio (NR) networks. However, the repeaters are assumed to have omnidirectional transmission/reception. Further, the repeaters are not capable to perform beamforming towards the user device, which causes an interference among other nodes in the wireless communication network. Further, the repeaters are always kept ON, which causes for an unnecessary power consumption. For current generation and next generation technologies, the repeaters does not address need for high directional transmission, less inter-node and inter-user interference. Further, the performance of the repeaters degrades heavily at higher frequencies.

Hence, there is a need for an improved network-controlled repeater for communicating a plurality of signals to at least one of: at least one base station (BS) and at least one user equipment (UE) in the wireless communication network, to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure In accordance with one embodiment of the disclosure, a network-controlled repeater (NCR) for communicating a plurality of signals to at least one of: at least one base station (BS) and at least one user equipment (UE) is disclosed. The network-controlled repeater (NCR) includes a mobile terminal (MT) configured to perform a signaling exchange with the at least one base station (BS) for at least one of: an initial access and synchronization. The mobile terminal (MT) is further configured to receive at least one side control information (SCI) from the at least one base station (BS). The at least one side control information (SCI) is at least a dynamic configuration. The at least one side control information (SCI) is received in at least one of: a dedicated control channel for the network-controller repeater (NCR) scrambled using a dedicated radio network temporary identifier (RNTI) for the at least one side control information (SCI) of the network-controller repeater (NCR).

The network-controlled repeater (NCR) further includes a radio unit (RU) configured to receive at least one signal of a first set of signals based on the at least one side control information (SCI). The radio unit (RU) is further configured to transmit the at least one signal of the first set of signals based on the at least one side control information (SCI).

In an embodiment, the network-controlled repeater (NCR) is configured to receive the at least one signal of the first set of signals from at least one of: the at least one base station (BS) and the at least one user equipment (UE). In another embodiment, the network-controller repeater (NCR) is configured to transmit the at least one signal of the first set of signals to at least one of: the at least one user equipment (UE) and the at least one base station (BS).

In yet another embodiment, the at least one signal of the first set of signals comprises at least one of: a plurality of synchronization signal blocks (SSB) signals, physical random-access channel (PRACH) signals, channel state information reference signals (CSI-RS), sounding reference signals (SRS), positioning reference signals (PRS), demodulation reference signals (DMRS), phase-tracking reference signals (PTRS), and data channels, and wherein the data channels comprise at least one of: a physical downlink control channel (PDCCH), a physical downlink shared channel (PDSCH), a physical uplink control channel (PUCCH), and a physical uplink shared channel (PUSCH).

In yet another embodiment, in performing the signaling exchange, the mobile terminal (MT) of the network-controller repeater (NCR) is configured to: (a) receive a downlink synchronization signal from the at least one base station (BS), (b) transmit an uplink synchronization signal to the at least one base station (BS), (c) transmit a radio resource control (RRC) setup request to the at least one base station (BS) for initiating a RRC connection to the at least one base station (BS), (d) receive an acknowledgement with a radio resource control (RRC) setup signal from the at least one base station (BS), (e) transmit a radio resource control (RRC) setup complete signal to the at least one base station (BS). The radio resource control (RRC) setup signal indicates a radio resource control (RRC) connected state of the mobile terminal (MT) with the at least one base station (BS). The mobile terminal (MT) indicates an identity of the mobile terminal (MT) in a network using a radio network temporary identifier (RNTI) dedicated for the mobile terminal (MT).

In yet another embodiment, the at least one side control information (SCI) comprises at least one of: a beamforming configuration, a time division duplex (TDD) configuration, a power control configuration, a timing advance (TA) configuration, and an ON-OFF configuration of the network-controller repeater (NCR).

In yet another embodiment, the beamforming configuration in the at least one side control information (SCI) comprises at least one of: beam information for adapting the network-controller repeater (NCR) to receive the at least one signal of the first set of signals from at least one of: the at least one base station (BS) and the at least one user equipment (UE), and beam information for adapting the network-controller repeater (NCR) to transmit the at least one signal of the first set of signals to at least one of: the at least one base station (BS) and the at least one user equipment (UE).

In yet another embodiment, the beamforming configuration in the at least one side control information (SCI) comprises at least one of: at least one beam-index, and at least one time-resource.

In yet another embodiment, in receiving the at least one signal of the first set of signals, the radio unit (RU) of the network-controller repeater (NCR) is configured to amplify the at least one signal of the first set of signals.

In yet another embodiment, the at least one base station (BS) is configured to determine whether the at least one user equipment (UE) is connected to the network-controller repeater (NCR) by: (a) scheduling the at least one user equipment (UE) to transmit the at least one signal of the first set of signals in a time resource, (b) signaling an OFF state indication to the network-controller repeater (NCR) in the time resource, (c) identifying an index of the at least one user equipment (UE) from which the at least one signal of the first set of signals is received in the time resource, (d) signaling an ON state indication to the network-controller repeater (NCR) in the time resource, and (e) determining whether the at least one user equipment (UE) is connected to the network-controller repeater (NCR), based on the at least one signal of the first set of signals received from the at least one user equipment (UE) through the network-controller repeater (NCR).

In yet another embodiment, the at least one base station (BS) is further configured to determine whether the at least one user equipment (UE) is connected to the network-controller repeater (NCR) by: (a) transmitting the at least one signal of first the set of signals in the time resource, wherein the radio unit (RU) of the network-controller repeater (NCR) is in OFF state in the time resource, (b) receiving power measurements in the at least one signal of the first set of signals, from the at least one user equipment (UE), (c) determining a degradation of the power measurements when the at least one user equipment (UE) moves to an edge of a coverage area of the at least one base station (BS), (d) signaling an ON state indication to the network-controller repeater (NCR), (e) transmitting the at least one signal of the first set of signals to the network-controller repeater (NCR), and (0 receiving the power measurements in at least one signal of the first set of signals from the at least one user equipment (UE) through the network-controller repeater (NCR), and (g) determining whether the at least one user equipment (UE) is connected to the network-controller repeater (NCR) based on the received power measurements in the at least one signal of the first set of signals. The network-controller repeater (NCR) is configured to receive the at least one signal of the first set of signals from the at least one base station (BS) and to transmit the received at least one signal of the first set of signals to the at least one user equipment (UE).

In yet another embodiment, when the radio unit (RU) of the network-controller repeater (NCR) comprises the radio frequency (RF) and L1 layer protocol stack, and in transmitting the at least one signal of the first set of signals, the radio unit (RU) of the network-controller repeater (NCR) is configured to generate the at least one signal of the first set of signals.

In yet another embodiment, in generating the at least one signal of the first set of signals is based on at least one of: the at least one side control information (SCI), the at least one signal of the first set of signals received at the network-controller repeater (NCR), and at least one signal received at the mobile terminal (MT) of the network-controller repeater (NCR).

In yet another embodiment, the at least one signal received at the mobile terminal (MT) of the network-controller repeater (NCR), comprises system information (SI), wherein the SI comprises at least one synchronization signal block (SSB) index.

In yet another embodiment, when the radio unit (RU) of the network-controller repeater (NCR) comprises the radio frequency (RF) and the L1 layer protocol stack, and in receiving the at least one signal of the first set of signals, the radio unit (RU) of the network-controller repeater (NCR) is configured to decode the at least one signal of the first set of signals.

In yet another embodiment, in decoding the at least one signal of the first set of signals, the radio unit (RU) of the network-controller repeater (NCR) is further configured to: (a) decode at least one signal of the first set of signals received from the at least one user equipment (UE), (b) determine an identity of the at least one user equipment (UE), and (c) transmit the identity of the at least one user equipment (UE), in the at least one signal of the first set of signals, to the at least one base station (BS).

In yet another embodiment, in receiving the at least one side control information (SCI) as a dynamic configuration, the network-controller repeater (NCR) is configured to receive the at least one side control information (SCI) in at least one of: a downlink control information (DCI) in dedicated physical downlink control channels (PDCCH). The downlink control information (DCI) comprises a separate format dedicated for the network-controller repeater (NCR). The separate format of the downlink control information (DCI) is scrambled using the radio network temporary identifier (RNTI) dedicated for the at least one side control information (SCI). The separate format of the downlink control information (DCI) format comprises fields for a plurality of side-control information applicable at a plurality of time resources.

In yet another embodiment, the at least one side control information (SCI) is at least one of: a static configuration and a semi-static configuration. In yet another embodiment, in receiving the at least one side control information (SCI) as at least one of: the static configuration and the semi-static configuration, the network-controller repeater (NCR) is configured to receive the at least one side control information (SCI) in a part of data in the physical downlink shared channel (PDSCH).

In yet another embodiment, upon receiving the at least one side control information (SCI), the network-controller repeater (NCR) is further configured to transmit a feedback to the at least one base station (BS), for the at least one side control information (SCI).

In yet another embodiment, in transmitting the feedback to the at least one base station (BS), for the at least one side control information (SCI), the network-controller repeater (NCR) is configured to transmit the feedback as a part of at least one of: the physical uplink control channel (PUCCH) and the physical uplink shared channel (PUSCH).

In yet another embodiment, the at least one base station (BS) is configured to determine a location of the at least one user equipment (UE) by: receiving the at least one signal of the first set of signals from the network-controller repeater (NCR), and determining the position of the at least one user equipment (UE) based on the at least one signal of the first set of signals and the at least one side control information (SCI).

In yet another embodiment, the at least one signal of the first set of signals comprises at least one of: the sounding reference signals (SRS) and the physical uplink shared channel (PUSCH) carrying measurement report on the positioning reference signals (PRS) from the at least one user equipment (UE).

In yet another embodiment, the at least one side control information (SCI) is the beamforming configuration at the network-controller repeater (NCR) for at least one of: receiving the sounding reference signals (SRS) from the at least one user equipment (UE) and transmitting the positioning reference signals (PRS) to the at least one user equipment (UE).

In yet another embodiment, the at least one user equipment (UE) is configured to determine the location of the at least one user equipment (UE) by: (a) receiving the at least one signal of the first set of signals from the network-controller repeater (NCR), (b) measuring on the at least one signal of the first set of signals, and (c) reporting the measurements of the at least one signal of the first set of signals.

In one aspect, a method for communicating a plurality of signals to at least one of: at least one base station (BS) and at least one user equipment (UE) using a network-controlled repeater (NCR) is disclosed. The method includes performing, by a mobile terminal (MT) of the network-controller repeater (NCR), a signaling exchange with the at least one base station (BS) for at least one of: an initial access and synchronization.

The method further includes receiving, by the mobile terminal (MT) of the network-controller repeater (NCR), at least one side control information (SCI) from the at least one base station (BS). The at least one side control information (SCI) is at least a dynamic configuration. The at least one side control information (SCI) is received in at least one of: a dedicated control channel for the network-controller repeater (NCR) scrambled using a dedicated radio network temporary identifier (RNTI) for the at least one side control information (SCI) of the network-controller repeater (NCR).

The method further includes receiving, by a radio unit (RU) of the network-controller repeater (NCR), at least one signal of a first set of signals based on the at least one side control information (SCI). The method further includes transmitting, by the radio unit (RU) of the network-controller repeater (NCR), the at least one signal of the first set of signals based on the at least one side control information (SCI).

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
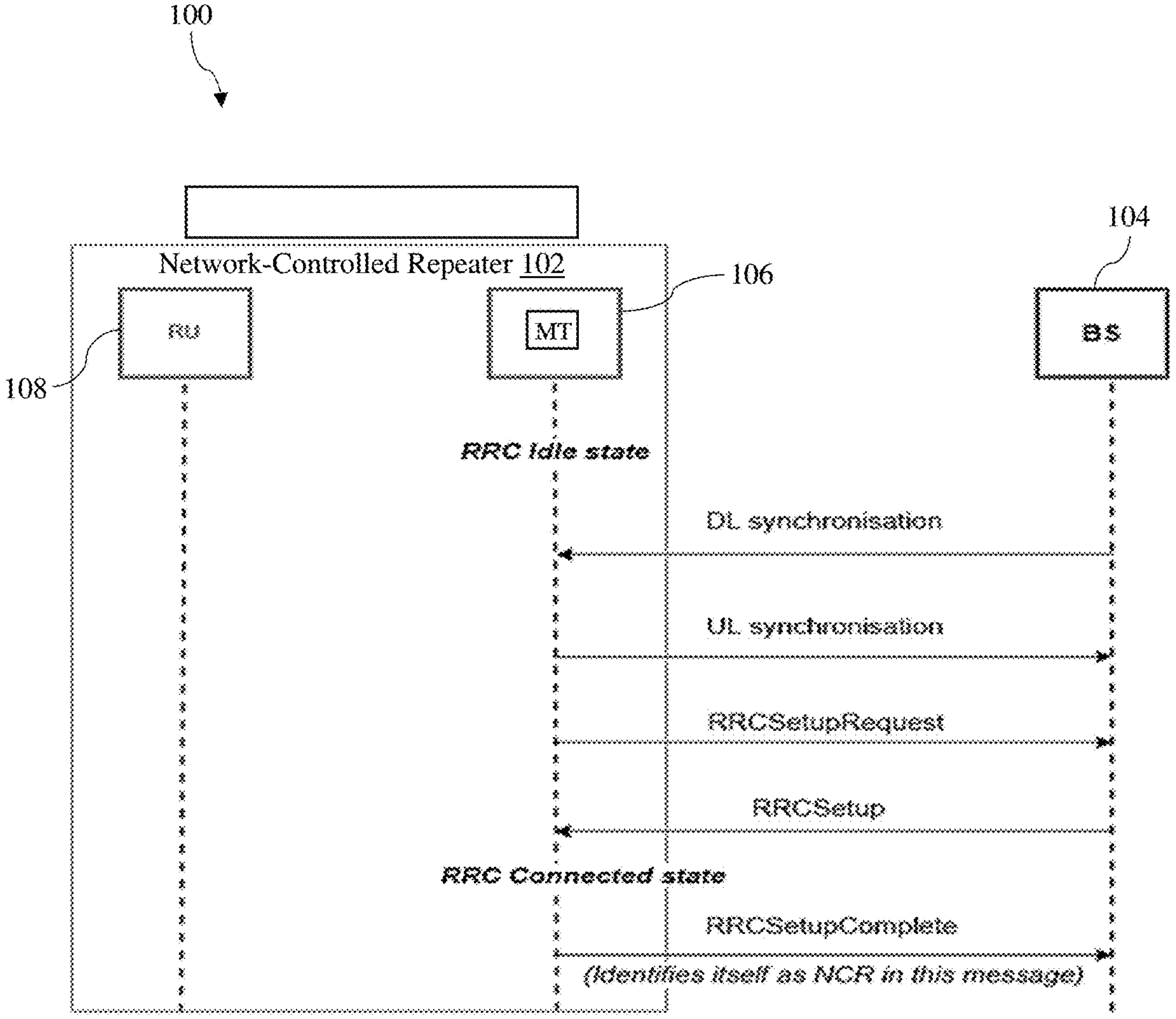
FIG. 1 is a schematic representation depicting that a network-controlled repeater (NCR) is connected to at least one base station (BS) in a wireless communication network, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "module" that is configured and operated to perform certain operations. In one embodiment, the "module" may be implemented mechanically or electronically, so a module may comprise dedicated circuitry or logic that is permanently configured (within a special-purpose processor) to perform certain operations. In another embodiment, a "module" may also comprise programmable logic or circuitry (as encompassed within a general-purpose processor or other programmable processor) that is temporarily configured by software to perform certain operations.

Accordingly, the term "module" should be understood to encompass a tangible entity, be that an entity that is physically constructed permanently configured (hardwired) or temporarily configured (programmed) to operate in a certain manner and/or to perform certain operations described herein.

FIG. 1 is a schematic representation depicting a network-controlled repeater (NCR) 102 that is connected to at least one base station (BS) 104 in a wireless communication network 100, in accordance with an embodiment of the present disclosure. The network-controlled repeater 102 includes a mobile terminal (MT) 106 and a radio unit (RU) 108. The mobile terminal 106 performs a signaling exchange with the at least one base station (BS) 104 for at least one of: an initial access and synchronization. For performing the signaling exchange, the mobile terminal 106 initially receives a downlink synchronization signal from the at least one base station 104. The mobile terminal 106 further transmits an uplink synchronization signal to the at least one base station 104. The uplink synchronization signal is transmitted from the mobile terminal 106 of the network-controlled repeater 102 to the at least one base station 104.

The mobile terminal 106 further transmits a radio resource control (RRC) setup request to the at least one base station 104 for initiating a RRC connection to the at least one base station 104. The mobile terminal 106 further receives an acknowledgement with an RRC setup signal from the at least base station 104. The RRC setup signal indicates a RRC connected state of the mobile terminal 106 of the network-controlled repeater 102 with the at least one base station 104. The mobile terminal 106 further transmits a RRC setup complete signal to the at least one base station 104. In an embodiment, the mobile terminal 106 indicates an identity of the mobile terminal 106 in the wireless communication network 100 using a radio network temporary identifier (RNTI) dedicated for the mobile terminal 106. In an embodiment, a functionality of the mobile terminal 106 is different from at least one user equipment (UE) (shown in FIG. 2). In another embodiment, the mobile terminal 106 in the network-controller repeater 102 is at least one of: static and dynamic. In an embodiment, the mobile terminal 106 may include a protocol stack up to a layer 3 (L3) (i.e., a layer 1 (L1), a layer 2 (L2), and a layer 3 (L3)).

The mobile terminal 106 further receives at least one side-control information from the at least one base station 104 using which the at least one base station 104 schedules and beamforms downlink (DL) and uplink (UL) messages for the at least one user equipment. Upon receiving the at least one side control information (SCI), the network-controller repeater (NCR) 102 is further configured to transmit a feedback to the at least one base station (BS) 104, for the at least one side control information (SCI). In an embodiment, in transmitting the feedback to the at least one base station (BS) 104, for the at least one side control information (SCI), the network-controller repeater (NCR) 102 is configured to transmit the feedback as a part of at least one of: a physical uplink control channel (PUCCH) and a physical uplink shared channel (PUSCH).

In an embodiment, the at least one side control information (SCI) includes at least one of: a beamforming configuration, a time division duplex (TDD) configuration, a power control configuration, a timing advance (TA) configuration, an ON-OFF configuration of the network-controller repeater (NCR) 102, and the like. In an embodiment, the at least one side control information (SCI) is at least a dynamic configuration. In another embodiment, the at least one side control information (SCI) is received in at least one of: a dedicated control channel for the network-controller repeater (NCR) 102 scrambled using a dedicated radio network temporary identifier (RNTI) for the at least one side control information (SCI) of the network-controller repeater (NCR) 102.

In an embodiment, in receiving the at least one side control information (SCI) as the dynamic configuration, the network-controller repeater (NCR) 102 is configured to receive the at least one side control information (SCI) in at least one of: a downlink control information (DCI) in dedicated physical downlink control channels (PDCCH). The downlink control information (DCI) includes a separate format dedicated for the network-controller repeater (NCR) 102. The separate format of the downlink control information (DCI) is scrambled using the radio network temporary identifier (RNTI) dedicated for the at least one side control information (SCI). The separate format of the downlink control information (DCI) format includes specific fields for a plurality of side-control information applicable at a plurality of time resources.

In an embodiment, the at least one side control information (SCI) is at least one of: a static configuration and a semi-static configuration. In another embodiment, in receiving the at least one side control information (SCI) as at least one of: the static configuration and the semi-static configuration, the network-controller repeater (NCR) 102 is configured to receive the at least one side control information (SCI) in a part of data in a physical downlink shared channel (PDSCH).

In an embodiment, the beamforming configuration in the at least one side control information (SCI) comprises at least one of: beam information for adapting the network-controller repeater (NCR) 102 to receive at least one signal of a first set of signals from at least one of: the at least one base station (BS) 104 and the at least one user equipment (UE), and beam information for adapting the network-controller repeater (NCR) 102 to transmit the at least one signal of the first set of signals to at least one of: the at least one base station (BS) 102 and the at least one user equipment (UE). In an embodiment, the beamforming configuration in the at least one side control information (SCI) comprises at least one of: at least one beam-index, and at least one time-resource.

The radio unit 108 of the network-controlled repeater 102 is configured to receive the at least one signal of the first set of signals based on the at least one side control information (SCI). The radio unit 108 is further configured to process/amplify the at least one signal of the first set of signals. In an embodiment, the radio unit 108 of the network-controlled repeater 102 is configured to receive the at least one signal of the first set of signals from at least one of: the at least one base station (BS) 104 and the at least one user equipment (UE). The radio unit 108 of the network-controlled repeater 102 is further configured to transmit the at least one signal of the first set of signals based on the at least one side control information (SCI). In an embodiment, radio unit 108 of the network-controlled repeater 102 is configured to transmit the at least one signal of the first set of signals to at least one of: the at least one user equipment (UE) and the at least one base station (BS) 104.

In an embodiment, the at least one signal of the first set of signals includes at least one of: a plurality of synchronization signal blocks (SSB) signals, physical random-access channel (PRACH) signals, channel state information reference signals (CSI-RS), sounding reference signals (SRS), positioning reference signals (PRS), demodulation reference signals (DMRS), phase-tracking reference signals (PTRS), and data channels, and wherein the data channels comprise at least one of: the physical downlink control channel (PDCCH), the physical downlink shared channel (PDSCH), the physical uplink control channel (PUCCH), and the physical uplink shared channel (PUSCH), based on a plurality of protocol stack capabilities (i.e., configurations) of the radio unit 108 of the network-controlled repeater 102. The plurality of protocol stack capabilities (i.e., configurations) are at least one of: a radio frequency (RF) layer protocol stack configuration, and a combination of RF layer and L1 layer protocol stack configuration.

In an embodiment, the RF layer protocol stack configuration performs a radio frequency process on any communication device. The radio frequency (RF) process includes at least one of: a digital to analog conversion (DAC)/analog to digital conversion (ADC), power amplification, up conversion/down conversion of a baseband/passband signal, and the like. In an embodiment, the L1 layer is a physical layer. The L1 layer protocol stack configuration performs baseband signal processes including digital modulation/demodulation, fast fourier transform (FFT)/Inverse fast fourier transform (IFFT), digital encoding/decoding, and the like.

Specifically, when the radio unit 108 includes at least the radio frequency (RF) protocol stack configuration, the network-controlled repeater 102 is configured to connect to the at least one base station 104 by receiving the at least one signal of the first set of signals (e.g., a SSB signal of the plurality of SSB signals) from the at least one base station 104 as a DL synchronization signal. The network-controlled repeater 102 is further configured to transmit at least one of: the SSB signal and the plurality of SSB signals to the at least one user equipment. The network-controlled repeater 102 transmits the SSB signal of the plurality of SSB signals to the at least one user equipment by (a) receiving the SSB signal from the at least one base station 104 on which the network-controlled repeater 102 is connected to the at least one base station 104, (b) receiving the beamforming configuration from the at least one base station 104, (c) generating at least one of: a beam and a plurality of beams from the beamforming configuration, for a coverage area of the network-controlled repeater 102 using the SSB signal, and (d) transmitting the SSB signal to the at least one user equipment in the coverage area of the network-controlled repeater 102.

In an embodiment, the network-controlled repeater 102 transmits at least one signal of the first set of signals (e.g., the plurality of SSB signals) to the at least one user equipment by (a) receiving the plurality of SSB signals on the beam from the at least one base station 104, (b) receiving the beamforming configuration as the side-control information from the at least one base station 104, (c) applying the beamforming configuration on the received plurality of SSB signals, and (d) transmitting the plurality of SSB signals to the at least one user equipment in a plurality of beam directions that are generated from the beamforming configuration.

In an embodiment, the at least one base station (BS) 104 is configured to determine whether the at least one user equipment (UE) is connected to the network-controller repeater (NCR) 102 by: (a) scheduling the at least one user equipment (UE) to transmit the at least one signal of the first set of signals in a time resource, (b) signaling an OFF state indication to the network-controller repeater (NCR) 102 in the time resource, (c) identifying an index of the at least one user equipment (UE) from which the at least one signal of the first set of signals is received in the time resource, (d) signaling an ON state indication to the network-controller repeater (NCR) 102 in the time resource, and (e) determining whether the at least one user equipment (UE) is connected to the network-controller repeater (NCR) 102, based on the at least one signal of the first set of signals received from the at least one user equipment (UE) through the network-controller repeater (NCR) 102.

For example, when the radio unit 108 includes at least the radio frequency (RF) protocol stack configuration, the network-controlled repeater 102 is configured to receive the at least one signal of the first set of signals (e.g., PRACH signals) from the at least one user equipment (UE). The network-controlled repeater 102 is configured to amplify the PRACH signals and transmit the PRACH signals to the at least one base station 104. In an embodiment, the network-controlled repeater 102 is configured to process the beamforming configuration for applying beamforming on the uplink signals received from the at least one user equipment (UE). In an embodiment, the at least one base station 104 is unaware of the at least one user equipment (UE) that is connected to the at least one base station 104 through the network-controlled repeater 102. The at least one base station 104 differentiates identities of at least one of: the at least one user equipment (UE) that is directly connected to the at least one base station 104, and the at least one user equipment (UE) that is connected to the at least one base station 104 through the network-controlled repeater 102.

The at least one base station 102 initially schedules the at least one user equipment (UE) to transmit the at least one signal of the first set of signals in the time resource (i.e., a time period). The at least one base station 104 transmits a signal to indicate OFF state to the network-controlled repeater 102 for the time period (i.e., a particular time period). In an embodiment, the network-controlled repeater 102 is in OFF state in a plurality of stages including at least one of: during the UL synchronization with the PRACH signals, after initiating the RRC connection using the CSI-RS signals and triggering CSI reports, and using sounding reference signals (SRS). The at least one base station 104 further receives the PRACH signals from the at least one user equipment (UE) that is directly connected to the network-controlled repeater 102.

The at least one base station 104 further stores identities of the at least user equipment (UE) based on the PRACH signals received from the at least one user equipment (UE). The at least one base station 104 further transmits the signal to indicate switch ON state to the network-controlled repeater 102 and instructs the network-controlled repeater 102 to transmit the PRACH signals to the at least one base station 104. The at least one base station 104 further determines the at least one user equipment (UE) that is connected to the network-controlled repeater 102 based on the PRACH signals received from the network-controlled repeater 102. Upon determining that the at least one user equipment (UE) is connected to the network-controlled repeater 102, the at least one base station 104 provides the beamforming configuration corresponding to the at least one user equipment (UE), to the network-controlled repeater 102 for at least one of: downlink (DL) transmission to the at least one user equipment (UE) and uplink (UL) reception from the at least one user equipment (UE).

In an embodiment, the at least one base station (BS) 104 is configured to determine whether the at least one user equipment (UE) is connected to the network-controller repeater (NCR) 102 by: (a) transmitting the at least one signal of first the set of signals (e.g., a reference signal (RS)) in the time resource, wherein the radio unit (RU) 108 of the network-controller repeater (NCR) 102 is in OFF state in the time resource, (b) receiving power measurements in the at least one signal of the first set of signals, from the at least one user equipment (UE), (c) determining a degradation of the power measurements when the at least one user equipment (UE) moves to an edge of a coverage area of the at least one base station (BS) 104, (d) signaling an ON state indication to the network-controller repeater (NCR) 102, (e) transmitting the at least one signal of the first set of signals to the network-controller repeater (NCR) 102, (f) receiving the power measurements in at least one signal of the first set of signals from the at least one user equipment (UE) through the network-controller repeater (NCR) 102, and (g) determining whether the at least one user equipment (UE) is connected to the network-controller repeater (NCR) 102 based on the received power measurements in the at least one signal of the first set of signals. In an embodiment, the network-controller repeater (NCR) 102 is configured to receive the at least one signal of the first set of signals from the at least one base station (BS) 104 and to transmit the received at least one signal of the first set of signals to the at least one user equipment (UE).

The radio unit 108 includes the radio frequency (RF) and L1 layer protocol stack configuration. When the radio unit 108 of the network-controller repeater 102 includes the radio frequency (RF) and L1 layer protocol stack configuration, and in transmitting the at least one signal of the first set of signals, the radio unit 108 of the network-controller repeater (NCR) 102 is configured to generate the at least one signal of the first set of signals. In an embodiment, in generating the at least one signal of the first set of signals is based on at least one of: the at least one side control information (SCI), the at least one signal of the first set of signals received at the network-controller repeater (NCR) 102, and at least one signal received at the mobile terminal (MT) 106 of the network-controller repeater (NCR) 102. In an embodiment, the at least one signal received at the mobile terminal (MT) 106 of the network-controller repeater (NCR) 102, includes system information (SI) and the SI comprises at least one synchronization signal block (SSB) index.

In this radio frequency (RF) and L1 layer protocol stack configuration, the network-controlled repeater 102 is capable of decoding the at least one signal of the first set of signals (DL and UL signals (i.e., messages)) at the L1 layer. In an embodiment, in decoding the at least one signal of the first set of signals, the radio unit (RU) 108 of the network-controller repeater (NCR) 102 is further configured to: (a) decode at least one signal of the first set of signals received from the at least one user equipment (UE), (b) determine an identity of the at least one user equipment (UE), and (c) transmit the identity of the at least one user equipment (UE), as the at least one signal of the first set of signals, to the at least one base station (BS) 104.

When the radio unit 108 of the network-controller repeater 102 includes the radio frequency (RF) and the L1 layer protocol stack configuration, the network-controlled repeater 102 amplifies and forwards the at least one signal of the first set of signals using the side-control information received from the at least one base station 104. The network-controlled repeater 102 is also capable of processing the at least one signal of the first set of signals at the L1 layer. During receiving the at least one signal of the first set of signals from the at least one base station 104, the network-controlled repeater 102 is connected to the at least one base station 104 through the SSB signal of the plurality of SSB signals. When the radio unit 108 includes the radio frequency (RF) and L1 layer protocol stack configuration, the network-controlled repeater 102 is configured to transmit at least one signal of the first set of signals (e.g., the plurality of SSB signals) to the at least one user equipment (UE) in the plurality of beams by (a) generating the plurality of SSB signals at the L1 layer of the network-controlled repeater 102 using the SSB signal of the plurality of SSB signals and the side-control information which are received from the at least one base station 104, (b) receiving the beamforming configuration as the side-control information from the at least one base station 104, (c) applying the beamforming configuration on the generated plurality of SSB signals, and (d) transmitting the plurality of SSB signals to the at least one user equipment (UE) in the plurality of beams. In an embodiment, the plurality of SSB signals are generated at the L1 layer based on system information (SI) received during a DL synchronization with the at least one base station 104. In another embodiment, the system information includes one or more SSB indices corresponding to the plurality of SSB signals. In an embodiment, the network-controlled repeater 102 is already time synchronized to the at least one base station 104.

When the radio unit 108 includes the radio frequency (RF) and L1 layer protocol stack configuration, the network-controlled repeater 102 amplifies and forwards the at least one signal from the set of signals (UL signals (i.e., uplink messages)) from the at least one user equipment (UE) towards the at least one base station 104. Due to the L1 configuration of the network-controlled repeater 102, the network-controlled repeater 102 decodes some information from the UL signals and transmits a feedback signal (i.e., a first feedback signal) to the at least one base station 104 for adapting the at least one base station 104 to determine the identity of the at least one user equipment (UE) that is connected to the network-controlled repeater 102. The determination of the identity of the at least one user equipment (UE) connected to the network-controlled repeater 102 is performed in two ways.

In first, the network-controlled repeater 102 is configured to: (a) receive the PRACH signals from the at least one user equipment (UE), (b) decode the information from the PRACH signals, (c) transmit the first feedback signal to the at least one base station 104 for adapting the at least one base station 104 to determine the at least one user equipment (UE) connected to the network-controlled repeater 102. In an embodiment, the information includes a plurality of preambles from the PRACH signals. In an embodiment, the first feedback signal includes the information decoded from the PRACH signals. In second, the network-controlled repeater 102 is configured to: (a) receive the RRC setup signal from the at least one base station 104, (b) decode the information from the RRC setup signal, (c) transmit the first feedback signal to the at least one base station 104 for adapting the at least one base station 104 to determine the at least one user equipment (UE) connected to the network-controlled repeater 102. In an embodiment, the information includes radio network temporary identifier (RNTI) values from the RRC setup signal. In an embodiment, the first feedback signal includes the information decoded from the RRC setup signal.

The network-controlled repeater 102 is configured to receive the beamforming configuration corresponding to the at least one user equipment (UE) from the at least one base station 104, for at least one of: the downlink (DL) transmissions (i.e., a physical downlink control channel (PDCCH)/a physical downlink shared channel (PDSCH) transmissions) to the at least one user equipment (UE) and the uplink (UL) receptions (i.e., a physical uplink control channel (PUCCH)/a physical uplink shared channel (PUSCH) transmissions) from the at least one user equipment (UE), when the network-controlled repeater 102 determines that the at least one user equipment (UE) connected to the network-controlled repeater 102.

The network-controlled repeater 102 is configured to transmit the at least one signal of the first set of signals (e.g., the channel state information reference signals (CSI-RS)) that are transmitted to the at least one user equipment (UE). The CSI-RS signals are used to perform the procedures including at least one of: a CSI acquisition, a beam management, an interference management, and the like with the at least one user equipment (UE). The network-controlled repeater 102 is configured to: (a) receive the CSI-RS signals from the at least one base station 104, and the CSI-RS signals are generated by the at least one base station 104 for CSI acquisition, (b) receive the beamforming configuration for the CSI-RS signals from the at least one base station 104, (c) transmit the CSI-RS signals on the plurality of beams to the at least one user equipment (UE), based on the beamforming configuration received from the at least one base station 104, and (d) receive CSI reports from the at least one user equipment (UE) and transmits the CSI reports to the at least one base station 104 for adapting the at least one base station 104 to determine a corresponding beam to be used for the at least one user equipment (UE) for the DL transmissions. In an embodiment, the same beam configuration may be used by the network-controlled repeater 102 for receiving the UL signal transmissions from the at least one user equipment (UE). In an embodiment, each CSI-RS resource is mapped to a separate beam.

Figure 2:
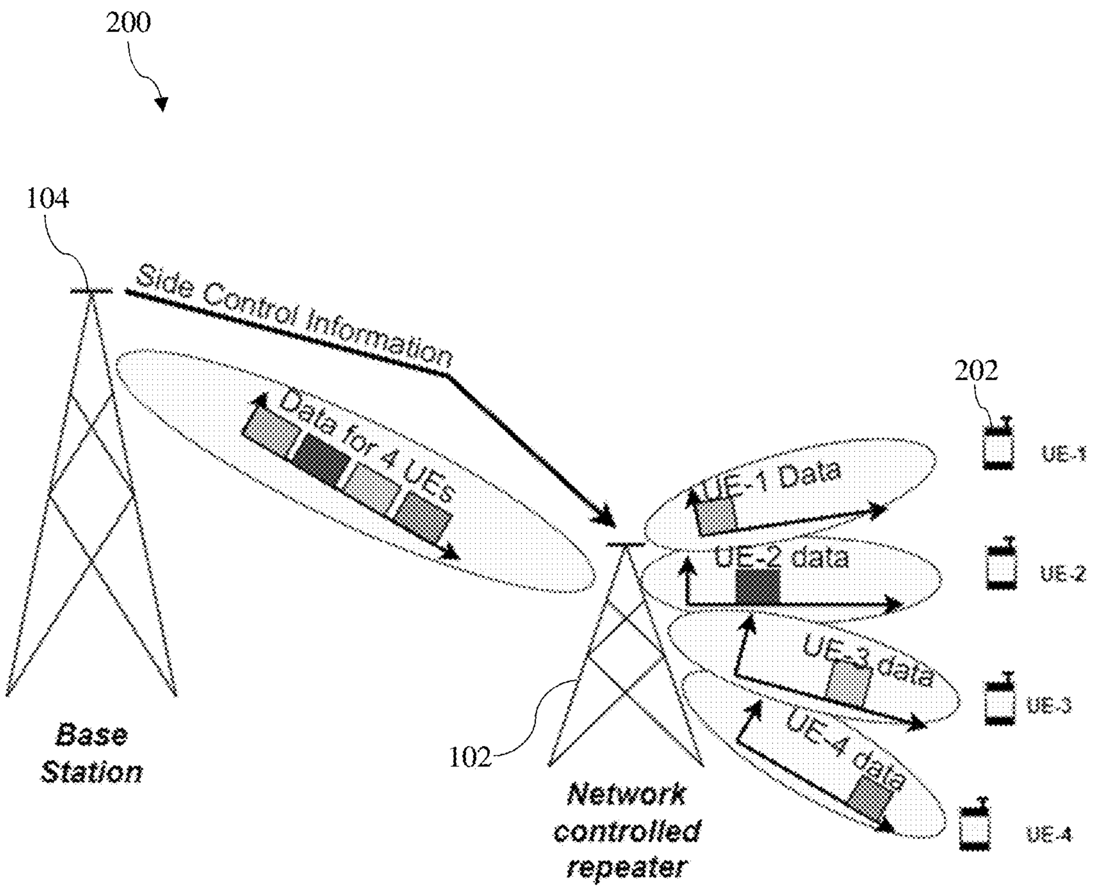
FIG. 2 is a schematic representation depicting that the network-controlled repeater receives at least one signal of a first set of signals from the at least one base station (BS) and transmits the at least one signal of the first set of signals to at least one user equipment (UE) on a plurality of beams, in accordance with an embodiment of the present disclosure.

FIG. 2 is a schematic representation 200 depicting that the network-controlled repeater 102 receives the at least one signal of the first set of signals from the at least one base station (BS) 104 and transmits the at least one signal of the first set of signals to the at least one user equipment (UE) 202 on at least one beam, in accordance with an embodiment of the present disclosure. FIG. 2 shows that the network-controlled repeater 102 receives the at least one side-control information along with the at least one signal of the first set of signals from the at least one base station 104. The at least one side-control information, received from the at least one base station 104, includes at least one of: the beamforming configuration, the scheduling information, the time division duplex (TDD) configuration, the ON-OFF configuration of the NCR 102, the timing advance (TA) configuration, and the power control information. The network-controlled repeater 102 processes/amplifies the at least one signal of the first set of signals. The network-controlled repeater 102 further beamforms and transmits the at least one signal of the first set of signals (i.e., the uplink and downlink signals) to the at least one user equipment (UE) 202 in the plurality of beams.

In an embodiment, the at least one side-control information is transmitted from the at least one base station 104 in a part of the downlink control information (DCI) over the physical downlink control channels (i.e., the PDCCH). A separate DCI format is used for communicating with the network-controlled repeater 102. The new DCI format includes specific fields to indicate a plurality of side-control information, which is applicable for a certain time resources (e.g., the beam configuration with periodicity of each beam, the TDD format, the ON or OFF state trigger from start time Ti, the timing advance value, different transmission power information for different beams, and the like).

In another embodiment, the at least one side-control information is transmitted from the at least one base station 104 in a part of data in the physical downlink shared channel (PDSCH). A set of time-frequency resources and periodicity are fixed during initial configuration of the network-controlled repeater 102 that is expected to receive the at least one side control information in these resources. The separate DCI format in the PDCCH is not required in this case, and the PDSCH data need to be decoded at the network-controlled repeater 102 to receive the side-control information.

In an embodiment, during the initial connection establishment between the network-controlled repeater 102 and the at least one base station 104, the at least one base station 104 determines the timing advance (TA) needed at the network-controlled repeater 102. Therefore, the at least one base station 104 is aware of a propagation delay (T_prop) between the at least one base station 104 and the network-controlled repeater 102. During a random access (RACH) process of the at least one user equipment (UE) 202 through the network-controlled repeater 102, the at least one base station 104 determines the timing advance (TA) and a propagation delay (i.e., T_prop) time from the at least one user equipment (UE) 202 to the network-controlled repeater 102 and then to the at least one base station 104. Further, the at least one base station 104 transmits the TA value to the network-controlled repeater 102 as the at least one side-control information for synchronizing the transmission and reception boundaries of the network-controlled repeater 102. In an embodiment, the network-controlled repeater 102 aligns its timing boundaries based on the TA value.

In an embodiment of the wireless communication network 100 with the network-controlled repeater 102, the network-controlled repeater 102 is configured to transmit only data messages (i.e., data signals). The transmission of the data signals using the network-controlled repeater 102 by (a) transmitting control signals for the at least one user equipment (UE) 202 and the control signals are received from the at least one base station 104, (b) receiving the at least one side-control information along with the beamforming configuration to the network-controlled repeater 102, and (c) transmitting the data signals to the at least one user equipment (UE) 202 using the beamforming configuration received from the at least one base station 104.

In an embodiment, the at least one base station (BS) 104 is configured to determine a location of the at least one user equipment (UE) 202 by: (a) receiving the at least one signal of the first set of signals from the network-controller repeater (NCR) 102, and (b) determining the position of the at least one user equipment (UE) 202 based on the at least one signal of the first set of signals and the at least one side control information (SCI). In an embodiment, the at least one signal of the first set of signals includes at least one of: the sounding reference signals (SRS) and the physical uplink shared channel (PUSCH) carrying measurement report on the positioning reference signals (PRS) from the at least one user equipment (UE) 202. In an embodiment, the at least one side control information (SCI) is the beamforming configuration at the network-controller repeater (NCR) 102 for at least one of: receiving the sounding reference signals (SRS) from the at least one user equipment (UE) 202 and transmitting the positioning reference signals (PRS) to the at least one user equipment (UE) 202.

In another embodiment, the at least one user equipment (UE) 202 is configured to determine the location of the at least one user equipment (UE) 202 by: (a) receiving the at least one signal of the first set of signals from the network-controller repeater (NCR) 102, (b) measuring on the at least one signal of the first set of signals, and (c) reporting the measurements of the at least one signal of the first set of signals.

Specifically, the location of the at least one user equipment (UE) 202 is determined using a location management entity. The location management entity determines the position of at least one of: the network-controlled repeater 102, the at least one user equipment (UE) 202, and the at least one base station 104. The location of the network-controlled repeater 102 in the wireless communication network 100 is known by the location management entity. To determine the location of the at least one user equipment (UE) 202, the at least one base station 104 transmits a plurality of positioning reference signals (PRS) in the downlink signals. The at least one base station 104 further transmits the beamforming configuration to the network-controlled repeater 102 to direct the plurality of PRS on the plurality of beams.

The at least one user equipment (UE) 202 detects the plurality of PRS signals from the network-controlled repeater 102 and the at least one base station 104 and then send measurement reports back to the at least one base station 104. Similarly in the uplink transmission, the at least one user equipment (UE) 202 transmits the sounding reference signal (SRS). The network-controlled repeater 102 receives sounding reference signal (SRS) and forwards the sounding reference signal (SRS) towards the at least one base station 104. The at least one base station 104 performs the positioning measurements on the SRS received directly from the at least one user equipment (UE) 202 and on the signals received through the network-controlled repeater 102. The at least one base station 104 is aware of the beam between the network-controlled repeater 102 and the at least one user equipment (UE) 202. The at least one base station 104 transmits/forwards the measurement reports to the location management entity. Based on the measurement reports of the at least one user equipment (UE) 202, the at least one base station 104 and the knowledge of the location and previous measurements from the network-controlled repeater 102, the location management entity determines the location of the at least one user equipment (UE) 202.

Figure 3:
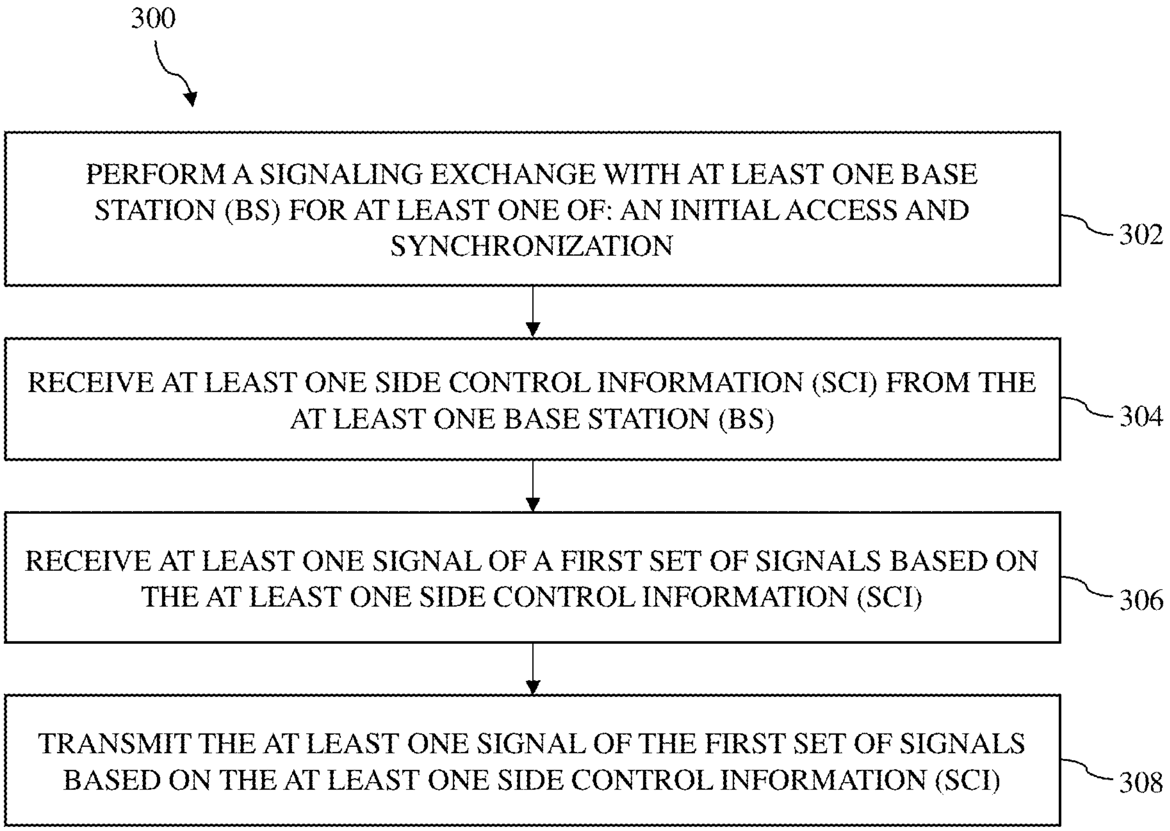
FIG. 3 is a flow chart illustrating a method for communicating a plurality of signals to at least one of: the at least one base station (BS) and the at least one user equipment (UE) using the network-controlled repeater, in accordance with an embodiment of the present disclosure.

FIG. 3 is a flow chart illustrating a method 300 for communicating the plurality of signals to at least one of: the at least one base station (BS) 104 and the at least one user equipment (UE) 202 using the network-controlled repeater 102, in accordance with an embodiment of the present disclosure. At step 302, the signaling exchange is performed with the at least one base station (BS) 104 for at least one of: an initial access and synchronization. At step 304, the at least one side control information (SCI) is received from at least one base station (BS) 104. In an embodiment, the at least one side control information (SCI) is at least the dynamic configuration. The at least one side control information (SCI) is received in at least one of: a dedicated control channel for the network-controller repeater (NCR) 102 scrambled using a dedicated radio network temporary identifier (RNTI) for the at least one side control information (SCI) of the network-controller repeater (NCR) 102.

At step 306, the at least one signal of a first set of signals is received at the radio unit (RU) 108 of the NCR based on the at least one side control information (SCI). In an embodiment, the radio unit (RU) 108 of the network-controlled repeater (NCR) 102 is configured to receive the at least one signal of the first set of signals from at least one of: the at least one base station (BS) 104 and the at least one user equipment (UE) 202. At step 308, the at least one signal of a first set of signals is transmitted from the radio unit (RU) 108 of the NCR based on the at least one side control information (SCI). In an embodiment, the radio unit (RU) 108 of the network-controlled repeater (NCR) 102 is configured to transmit the at least one signal of the first set of signals to at least one of: the at least one user equipment (UE) 202 and the at least one base station (BS) 104.

The present invention has following advantages. The network-controlled repeater 102 is used to extend the coverage of the at least one base station 104 and to increase the data throughput to the at least one base station 104 and the at least one user equipment (UE) 202. The present invention is an enhancement to the existing repeaters. The present invention describes the network-controlled repeater 102 with capabilities including at least one of: beamforming towards the at least one user equipment (UE) 202, scheduling the downlink and uplink transmissions, dynamically switching the network-controlled repeater 102 ON-OFF, managing the power control, and the like. These enhanced capabilities of the network-controlled repeater 102 help to mitigate the interference among the at least one user equipment (UE) 202 and reduce the power consumption of the network-controlled repeater 102.

The present invention utilizes the plurality of protocol stack capabilities/configurations for the network-controlled repeater 102. The present invention utilizes the plurality of procedures related to the at least one user equipment (UE) 202 that the network-controlled repeater 102 may perform with the help of the control information received from the at least one base station 104. The present invention utilizes the control signalling for configuring the network-controlled repeater 102 for data/signal forwarding towards the at least one user equipment (UE) 202.

The present invention utilizes the procedure for the at least one base station 104 to determine the at least one user equipment (UE) 202 that are connected to the at least one base station 104 through the network-controlled repeater 102. The present invention utilizes the procedure for transmitting the at least one signal of the first set of signals to the at least one user equipment (UE) 202 that is moving from the at least one base station's 104 coverage area to network-controlled repeater's 102 coverage area. Further, the network-controlled repeater 102 is utilized in the wireless communication network 100 to relay the signals between the at least one base station 104 and at least one user equipment (UE) 202.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, and the like.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at-least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like. of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A network-controlled repeater (NCR) relaying a plurality of signals to at least one of: at least one base station (BS) and at least one user equipment (UE), the network-controlled repeater (NCR) comprising:

a mobile terminal (MT) configured to:

perform a signaling exchange with the at least one base station (BS), wherein in performing the signalling exchange, the mobile terminal (MT) of the network-controller repeater is configured to:

transmit at least one signal comprising an indication that the connection is being established by an NCR, wherein the at least one signal is a radio resource control (RRC) setup complete signal;

receive at least one side control information (SCI) from the at least one BS, wherein the at least one SCI comprises at least one of: a static configuration, a semi-static configuration and a dynamic configuration, wherein the at least one SCI is received in a dedicated control channel for the network-controller repeater (NCR) scrambled using a dedicated radio network temporary identifier (RNTI) for the network-controller repeater (NCR), and wherein the at least one SCI comprises at least one of a beamforming configuration, a time division duplex (TDD) configuration, a power control configuration, a timing advance (TA) configuration, and an ON-OFF configuration of the network-controller repeater (NCR);

herein the beamforming configuration in the at least one SCI comprises:

at least one beam-index; and at least one time-resource;

transmit a feedback to the at least one BS, wherein the feedback comprises a feedback for the at least one SCI;

a radio unit (RU) configured to:

receive at least one signal of a first set of signals based on the at least one SCI; and transmit the at least one signal of the first set of signals based on the at least one SCI;

the at least one base station (BS) is further configured to determine whether the at least one user equipment (UE) is connected to the network-controller repeater (NCR) by:

transmitting the at least one signal of first the set of signals in the time resource, wherein the radio unit (RU) of the network-controller repeater (NCR) is in OFF state in the time resource;

receiving power measurements in the at least one signal of the first set of signals, from the at least one user equipment (UE);

determining a degradation of the power measurements when the at least one user equipment (UE) moves to an edge of a coverage area of the at least one base station (BS);

signaling an ON state indication to the network-controller repeater (NCR);

transmitting the at least one signal of the first set of signals to the network-controller repeater (NCR), wherein the network-controller repeater (NCR) is configured to receive the at least one signal of the first set of signals from the at least one base station (BS) and to transmit the received at least one signal of the first set of signals to the at least one user equipment (UE);

receiving the power measurements in at least one signal of the first set of signals from the at least one user equipment (UE) through the network-controller repeater (NCR); and determining whether the at least one user equipment (UE) is connected to the network-controller repeater (NCR) based on the received power measurements in the at least one signal of the first set of signals.

2. The network-controlled repeater (NCR) as claimed in claim 1, wherein the network-controlled repeater (NCR) is configured to receive the at least one signal of the first set of signals from at least one of: the at least one base station (BS) and the at least one user equipment (UE).

3. The network-controlled repeater (NCR) as claimed in claim 1, wherein the network-controller repeater (NCR) is configured to transmit the at least one signal of the first set of signals to at least one of: the at least one user equipment (UE) and the at least one base station (BS).

4. The network-controller repeater (NCR) as claimed in claim 1, wherein the at least one signal of the first set of signals comprises at least one of: a plurality of synchronization signal blocks (SSB) signals, physical random-access channel (PRACH) signals, channel state information reference signals (CSI-RS), sounding reference signals (SRS), positioning reference signals (PRS), demodulation reference signals (DMRS), phase-tracking reference signals (PTRS), and data channels, and wherein the data channels comprise at least one of: a physical downlink control channel (PDCCH), a physical downlink shared channel (PDSCH), a physical uplink control channel (PUCCH), and a physical uplink shared channel (PUSCH).

5. The network-controller repeater (NCR) as claimed in claim 1, wherein in performing the signaling exchange, the mobile terminal (MT) of the network-controller repeater (NCR) is configured to:

perform the signalling exchange for at least one of: an initial access and synchronization;

receive a downlink synchronization signal from the at least one base station (BS);

transmit an uplink synchronization signal to the at least one base station (BS);

transmit a radio resource control (RRC) setup request to the at least one base station (BS) for initiating a RRC connection to the at least one base station (BS); and receive an acknowledgement with a radio resource control (RRC) setup signal from the at least one base station (BS), wherein the radio resource control (RRC) setup signal indicates a radio resource control (RRC) connected state of the mobile terminal (MT) with the at least one base station (BS).

6. The network-controller repeater (NCR) as claimed in claim 1, wherein the beamforming configuration in the at least one side control information (SCI) comprises at least one of:

beam information for adapting the network-controller repeater (NCR) to receive the at least one signal of the first set of signals from at least one of: the at least one base station (BS) and the at least one user equipment (UE); and beam information for adapting the network-controller repeater (NCR) to transmit the at least one signal of the first set of signals to at least one of: the at least one base station (BS) and the at least one user equipment (UE).

7. The network-controller repeater (NCR) as claimed in claim 1, wherein in receiving the at least one signal of the first set of signals, the radio unit (RU) of the network-controller repeater (NCR) is configured to amplify the at least one signal of the first set of signals.

8. The network-controller repeater (NCR) as claimed in claim 1, wherein the at least one base station (BS) is configured to determine whether the at least one user equipment (UE) is connected to the network-controller repeater (NCR) by:

scheduling the at least one user equipment (UE) to transmit the at least one signal of the first set of signals in a time resource;

signaling an OFF state indication to the network-controller repeater (NCR) in the time resource;

identifying an index of the at least one user equipment (UE) from which the at least one signal of the first set of signals is received in the time resource;

signaling an ON state indication to the network-controller repeater (NCR) in the time resource; and determining whether the at least one user equipment (UE) is connected to the network-controller repeater (NCR), based on the at least one signal of the first set of signals received from the at least one user equipment (UE) through the network-controller repeater (NCR).

9. The network-controller repeater (NCR) as claimed in claim 1, wherein when the radio unit (RU) of the network-controller repeater (NCR) comprises the radio frequency (RF) and L1 layer protocol stack, and in transmitting the at least one signal of the first set of signals, the radio unit (RU) of the network-controller repeater (NCR) is configured to generate the at least one signal of the first set of signals, wherein in generating the at least one signal of the first set of signals is based on at least one of:

the at least one side control information (SCI);

the at least one signal of the first set of signals received at the network-controller repeater (NCR); and at least one signal received at the mobile terminal (MT) of the network-controller repeater (NCR), wherein the at least one signal received at the mobile terminal (MT) of the network-controller repeater (NCR), comprises system information (SI), wherein the SI comprises at least one synchronization signal block (SSB) index.

10. The network-controller repeater (NCR) as claimed in claim 1, wherein when the radio unit (RU) of the network-controller repeater (NCR) comprises the radio frequency (RF) and the L1 layer protocol stack, and in receiving the at least one signal of the first set of signals, the radio unit (RU) of the network-controller repeater (NCR) is configured to decode the at least one signal of the first set of signals, wherein in decoding the at least one signal of the first set of signals, the radio unit (RU) of the network-controller repeater (NCR) is further configured to:

decode at least one signal of the first set of signals received from the at least one user equipment (UE);

determine an identity of the at least one user equipment (UE); and transmit the identity of the at least one user equipment (UE), in the at least one signal of the first set of signals, to the at least one base station (BS).

11. The network-controller repeater (NCR) as claimed in claim 1, wherein in receiving the at least one side control information (SCI) as a dynamic configuration, the network-controller repeater (NCR) is configured to:

receive the at least one side control information (SCI) in at least one of: a downlink control information (DCI) in dedicated physical downlink control channels (PDCCH), wherein the downlink control information (DCI) comprises a separate format dedicated for the network-controller repeater (NCR), wherein the separate format of the downlink control information (DCI) is scrambled using the radio network temporary identifier (RNTI) dedicated for the at least one side control information (SCI), and wherein the separate format of the downlink control information (DCI) format comprises fields for a plurality of side-control information applicable at a plurality of time resources.

12. The network-controller repeater (NCR) as claimed in claim 1, wherein in receiving the at least one side control information (SCI) as at least one of: the static configuration and the semi-static configuration, the network-controller repeater (NCR) is configured to:

receive the at least one side control information (SCI) in a part of data in the physical downlink shared channel (PDSCH).

13. The network-controller repeater (NCR) as claimed in claim 1, wherein in transmitting the feedback to the at least one base station (BS), the network-controller repeater (NCR) is configured to:

transmit the feedback as a part of at least one of: the physical uplink control channel (PUCCH) and the physical uplink shared channel (PUSCH).

14. The network-controller repeater (NCR) as claimed in claim 1, wherein the at least one base station (BS) is configured to determine a location of the at least one user equipment (UE) by:

receiving the at least one signal of the first set of signals from the network-controller repeater (NCR); and determining the position of the at least one user equipment (UE) based on the at least one signal of the first set of signals and the at least one side control information (SCI), wherein the at least one signal of the first set of signals comprises at least one of: the sounding reference signals (SRS) and the physical uplink shared channel (PUSCH) carrying measurement report on the positioning reference signals (PRS) from the at least one user equipment (UE), wherein the at least one side control information (SCI) is the beamforming configuration at the network-controller repeater (NCR) for at least one of: receiving the sounding reference signals (SRS) from the at least one user equipment (UE) and transmitting the positioning reference signals (PRS) to the at least one user equipment (UE), wherein the at least one user equipment (UE) is configured to determine the location of the at least one user equipment (UE) by:

receiving the at least one signal of the first set of signals from the network-controller repeater (NCR);

measuring on the at least one signal of the first set of signals; and reporting the measurements of the at least one signal of the first set of signals.

15. A method for relaying a plurality of signals to at least one of: at least one base station (BS) and at least one user equipment (UE) using a network-controlled repeater (NCR), the method comprising:

performing, by a mobile terminal (MT) of the network-controller repeater (NCR), a signaling exchange with the at least one base station (BS);

wherein performing the signalling exchange comprises:

transmitting, by the mobile terminal (MT) of the network-controller repeater (NCR), at least one signal comprising an indication that the connection is being established by an NCR;

wherein the at least one signal is a radio resource control (RRC) setup complete signal;

receiving, by the mobile terminal (MT) of the network-controller repeater (NCR), at least one side control information (SCI) from the at least one base station (BS), wherein the at least one SCI comprises at least one of: a static configuration, a semi-static configuration and a dynamic configuration, wherein the at least one SCI is received in at least one of: a dedicated control channel for the network-controller repeater (NCR) scrambled using a dedicated radio network temporary identifier (RNTI) for the network-controller repeater (NCR), and wherein the at least one SCI comprises at least one of: a beamforming configuration, a time division duplex (TDD) configuration, a power control configuration, a timing advance (TA) configuration, and an ON-OFF configuration of the network-controller repeater (NCR), wherein the beamforming configuration in the at least one side control information (SCI) comprises:

at least one beam-index; and at least one time-resource;

transmitting, by the mobile terminal (MT) of the network controller repeater (NCR), a feedback to the at least one BS;

wherein the feedback comprises a feedback for the at least one SCI;

receiving, by a radio unit (RU) of the network-controller repeater (NCR), at least one signal of a first set of signals based on the at least one SCI; and transmitting, by the radio unit (RU) of the network-controller repeater (NCR), the at least one signal of the first set of signals based on the at least one SCI;

determining, by the at least one base station (BS), whether the at least one user equipment (UE) is connected to the network-controller repeater (NCR) by:

transmitting, by the at least one base station (BS), the at least one signal of the first set of signals in the time resource, wherein the radio unit (RU) of the network-controller repeater (NCR) is in OFF state in the time resource;

receiving, by the at least one base station (BS), power measurements in the at least one signal of the first set of signals, from the at least one user equipment (UE);

determining, by the at least one base station (BS), a degradation of the power measurements when the at least one user equipment (UE) moves to an edge of a coverage area of the at least one base station (BS);

signaling, by the at least one base station (BS), an ON state indication to the network-controller repeater (NCR);

transmitting, by the at least one base station (BS), the at least one signal of the first set of signals to the network-controller repeater (NCR), wherein the network-controller repeater (NCR) is configured to receive the at least one signal of the first set of signals from the at least one base station (BS) and to transmit the received at least one signal of the first set of signals to the at least one user equipment (UE);

receiving, by the at least one base station (BS), the power measurements in at least one signal of the first set of signals from the at least one user equipment (UE) through the network-controller repeater (NCR); and determining, by the at least one base station (BS), whether the at least one user equipment (UE) is connected to the network-controller repeater (NCR) based on the received power measurements in the at least one signal of the first set of signals.

16. The method as claimed in claim 15, wherein receiving the at least one signal of the first set of signals based on the at least one side control information (SCI) comprises receiving, by the radio unit (RU) of the network-controller repeater (NCR), the at least one signal of the first set of signals from at least one of: the at least one base station (BS) and the at least one user equipment (UE).

17. The method as claimed in claim 15, wherein transmitting the at least one signal of the first set of signals based on the at least one side control information (SCI) comprises transmitting, by the radio unit (RU) of the network-controller repeater (NCR), the at least one signal of the first set of signals to at least one of: the at least one user equipment (UE) and the at least one base station (BS).

18. The method as claimed in claim 15, wherein the at least one signal of the first set of signals comprises at least one of: a plurality of synchronization signal blocks (SSB) signals, physical random-access channel (PRACH) signals, channel state information reference signals (CSI-RS), sounding reference signals (SRS), positioning reference signals (PRS), demodulation reference signals (DMRS), phase-tracking reference signals (PTRS), and data channels, and wherein the data channels comprise at least one of: a physical downlink control channel (PDCCH), a physical downlink shared channel (PDSCH), a physical uplink control channel (PUCCH), and a physical uplink shared channel (PUSCH).

19. The method as claimed in claim 15, wherein performing the signaling exchange comprises:

performing the signaling exchange for at least one of: an initial access and synchronization;

receiving, by the mobile terminal (MT) of the network-controller repeater (NCR), a downlink synchronization signal from the at least one base station (BS);

transmitting, by the mobile terminal (MT) of the network-controller repeater (NCR) (102), an uplink synchronization signal to the at least one base station (BS);

transmitting, by the mobile terminal (MT) of the network-controller repeater (NCR), a radio resource control (RRC) setup request to the at least one base station (BS) for initiating a RRC connection to the at least one base station (BS); and receiving, by the mobile terminal (MT) of the network-controller repeater (NCR), an acknowledgement with a radio resource control (RRC) setup signal from the at least one base station (BS), wherein the radio resource control (RRC) setup signal indicates a radio resource control (RRC) connected state of the mobile terminal (MT) with the at least one base station (BS).

20. The method as claimed in claim 15, wherein the beamforming configuration in the at least one side control information (SCI) comprises at least one of:

beam information for adapting the network-controller repeater (NCR) to receive at least one signal of the first set of signals from at least one of: the at least one base station (BS) and the at least one user equipment (UE); and beam information for adapting the network-controller repeater (NCR) to transmit the at least one signal of the first set of signals to at least one of: the at least one base station (BS) and the at least one user equipment (UE).

21. The method as claimed in claim 15, wherein receiving the at least one signal of the first set of signals comprises amplifying, by the radio unit (RU) of the network-controller repeater (NCR), the at least one signal of the first set of signals.

22. The method as claimed in claim 15, further comprising determining, by the at least one base station (BS), whether the at least one user equipment (UE) is connected to the network-controller repeater (NCR) by:

scheduling, by the at least one base station (BS), the at least one user equipment (UE) to transmit the at least one signal of the first set of signals in a time resource;

signaling, by the at least one base station (BS), an OFF state indication to the network-controller repeater (NCR) in the time resource;

identifying, by the at least one base station (BS), an index of the at least one user equipment (UE) from which the at least one signal of the first set of signals is received in the time resource;

signaling, by the at least one base station (BS), an ON state indication to the network-controller repeater (NCR) in the time resource; and determining, by the at least one base station (BS), whether the at least one user equipment (UE) is connected to the network-controller repeater (NCR), based on the at least one signal of the first set of signals received from the at least one user equipment (UE) through the network-controller repeater (NCR).

23. The method as claimed in claim 15, wherein when the radio unit (RU) of the network-controller repeater (NCR) comprises the radio frequency (RF) and L1 layer protocol stack, and transmitting the at least one signal of the first set of signals comprises generating, by the radio unit (RU) of the network-controller repeater (NCR), the at least one signal of the first set of signals, wherein generating the at least one signal of the first set of signals is based on at least one of:

the at least one side control information (SCI);

the at least one signal of the first set of signals received at the network-controller repeater (NCR); and at least one signal received at the mobile terminal (MT) of the network-controller repeater (NCR), wherein the at least one signal received at the mobile terminal (MT) of the network-controller repeater (NCR), comprises system information (SI), wherein the SI comprises at least one synchronization signal block (SSB) index.

24. The method as claimed in claim 15, wherein when the radio unit (RU) of the network-controller repeater (NCR) comprises the radio frequency (RF) and the L1 layer protocol stack, and receiving the at least one signal of the first set of signals comprises decoding, by the radio unit (RU) of the network-controller repeater (NCR), the at least one signal of the first set of signals, wherein decoding the at least one signal of the first set of signals comprises:

decoding, by the radio unit (RU) of the network-controller repeater (NCR), the at least one signal of the first set of signals received from the at least one user equipment (UE);

determining, by the radio unit (RU) of the network-controller repeater (NCR), an identity of the at least one user equipment (UE); and transmitting, by the radio unit (RU) of the network-controller repeater (NCR), the identity of the at least one user equipment (UE), in the at least one signal of the first set of signals, to the at least one base station (BS).

25. The method as claimed in claim 15, wherein receiving, by the mobile terminal (MT) of the network-controller repeater (NCR), the at least one side control information (SCI) as a dynamic configuration, comprises:

receiving, by the mobile terminal (MT) of the network-controller repeater (NCR), the at least one side control information (SCI) in at least one of: a downlink control information (DCI) in dedicated physical downlink control channels (PDCCH), wherein the downlink control information (DCI) comprises a separate format dedicated for the network-controller repeater (NCR), wherein the separate format of the downlink control information (DCI) is scrambled using the radio network temporary identifier (RNTI) dedicated for the at least one side control information (SCI), and wherein the separate format of the downlink control information (DCI) format comprises fields for a plurality of side-control information applicable at a plurality of time resources.

26. The method as claimed in claim 15, wherein receiving, by the mobile terminal (MT) of the network-controller repeater (NCR), the at least one side control information (SCI) as at least one of: the static configuration and the semi-static configuration, comprises:

receiving, by the mobile terminal (MT) of the network-controller repeater (NCR), the at least one side control information (SCI) in a part of data in the physical downlink shared channel (PDSCH).

27. The method as claimed in claim 15, wherein transmitting, by the mobile terminal (MT) of the network-controller repeater (NCR), the feedback to the at least one base station (BS), comprises:

transmitting, by the mobile terminal (MT) of the network-controller repeater (NCR), the feedback as a part of at least one of: the physical uplink control channel (PUCCH) and the physical uplink shared channel (PUSCH).

28. The method as claimed in claim 15, further comprising determining, by the at least one base station (BS), a location of the at least one user equipment (UE) by:

receiving, by the at least one base station (BS), the at least one signal of the first set of signals from the network-controller repeater (NCR); and determining, by the at least one base station (BS), the position of the at least one user equipment (UE) based on the at least one signal of the first set of signals and the at least one side control information (SCI), wherein the at least one signal of the first set of signals comprises at least one of: the sounding reference signals (SRS) and the physical uplink shared channel (PUSCH) carrying measurement report on the positioning reference signals (PRS) from the at least one user equipment (UE), wherein the at least one side control information (SCI) is the beamforming configuration at the network-controller repeater (NCR) for at least one of: receiving the sounding reference signals (SRS) from the at least one user equipment (UE) and transmitting the positioning reference signals (PRS) to the at least one user equipment (UE), wherein determining, by the at least one user equipment (UE), the location of the at least one user equipment (UE) by:

receiving, by the at least one user equipment (UE), the at least one signal of the first set of signals from the network-controller repeater (NCR);

measuring, by the at least one user equipment (UE), on the at least one signal of the first set of signals; and reporting, by the at least one user equipment (UE), the measurements of the at least one signal of the first set of signals.

29. The method as claimed in claim 15, wherein the at least one identity is based on the at least one signal of the first set of signal received.

30. The method as claimed in claim 15, wherein transmitting the feedback to the at least one BS comprises reporting the UE location at the NCR granularity.

* * * * *